(12) United States Patent
Gomes De Oliveira

(10) Patent No.: US 7,297,258 B2
(45) Date of Patent: Nov. 20, 2007

(54) COUPLING OF A SEWER TREATMENT STATION TO A TREATMENT PLANT FOR THE FLOCCULATION AND FLOTATION OF WATER STREAMS AND THE INSERTION OF TREATMENT PLANT FOR THE FLOCCULATION AND FLOTATION OF WATER STREAMS INTO A WATER TREATMENT STATION

(76) Inventor: João Carlos Gomes De Oliveira, Alameda Campinas, 368 - Alphaville IV, Barueri - SP - 65000-000 (BR)

( * ) Notice: Subject to any disclaimer, the term of this patent is extended or adjusted under 35 U.S.C. 154(b) by 436 days.

(21) Appl. No.: 10/852,691

(22) Filed: May 25, 2004

(65) Prior Publication Data

US 2004/0245180 A1 Dec. 9, 2004

(30) Foreign Application Priority Data

May 30, 2003 (BR) .................................... 0301519

(51) Int. Cl.
*C02F 1/24* (2006.01)
(52) U.S. Cl. .................. 210/221.2; 210/202; 210/205; 210/170.01; 210/170.1
(58) Field of Classification Search ............. 210/221.2, 210/202, 205, 170.01, 170.1
See application file for complete search history.

(56) References Cited

U.S. PATENT DOCUMENTS

| | | | | |
|---|---|---|---|---|
| 3,707,464 A | * | 12/1972 | Burns | 210/705 |
| 4,253,949 A | * | 3/1981 | Hines et al. | 210/703 |
| 6,802,978 B2 | * | 10/2004 | Gomes de Oliveira et al. | 210/703 |
| 2003/0085176 A1 | * | 5/2003 | Gomes De Oliveira et al. | 210/703 |

* cited by examiner

*Primary Examiner*—Thomas M. Lithgow
(74) *Attorney, Agent, or Firm*—Hoffman, Wasson & Gitler, PC

(57) ABSTRACT

The coupling of a sewer treatment station to a treatment plant for the flocculation and flotation of water streams and the insertion of said treatment plant for the flocculation and flotation of water streams into a water treatment station. The sewer treatment station is installed upstream from the flocculation and flotation treatment station, in such a way that the outlet of said station is directly connected to the inlet of the flocculation and flotation treatment plant disposed next to the stream bed or next to and interconnected thereto by means of a varying flow canal. The insertion has dynamic introduction of the process of treatment for the flocculation and flotation of fluid beds, all in a closed canal, wherein the flow of secondary streams (E) is dynamically and continuously submitted to flocculation and flotation techniques in an induced flow canal (FE) in the water treatment station.

4 Claims, 7 Drawing Sheets

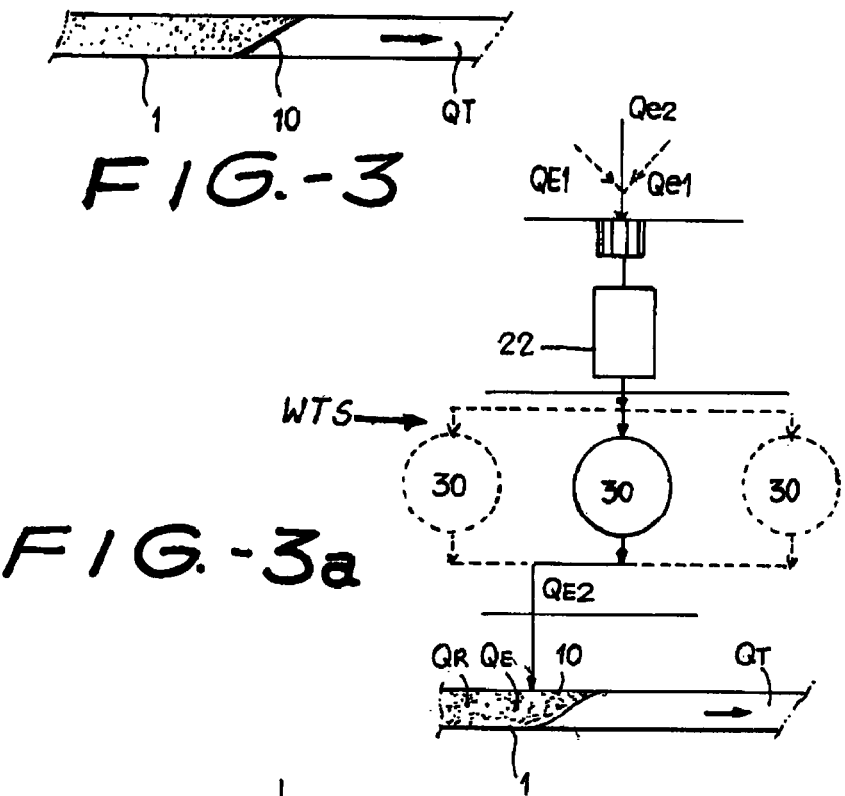
FIG.-3
FIG.-3a
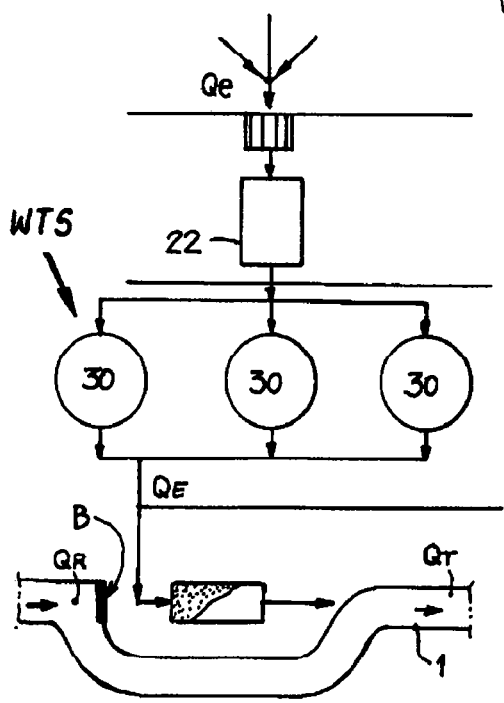
FIG.-3b

COUPLING OF A SEWER TREATMENT STATION TO A TREATMENT PLANT FOR THE FLOCCULATION AND FLOTATION OF WATER STREAMS AND THE INSERTION OF TREATMENT PLANT FOR THE FLOCCULATION AND FLOTATION OF WATER STREAMS INTO A WATER TREATMENT STATION

BACKGROUND OF THE INVENTION

The invention is directed to the coupling of a sewer treatment station-STS—to a treatment plant for the flocculation and flotation of water streams and, more specifically, to the insertion of a sewer treatment station—STS—as a dynamic primary treatment stage in the optimization of the treatment process for the flocculation and flotation of water streams in urban regions and/or regions nearby.

Further, it is related to the insertion of a treatment plant for the flocculation and flotation of water streams into a water treatment station—WTS—and, more specifically, to an adaptation in the Water Treatment Station—WTS—inserted for the optimization of the treatment process in preexisting conventional installations and/or design of new installations.

In general lines, urbanization is based on the water availability for impounding drinking water to supply the public. Notably, except for a few cases, cities are created and developed next to water bodies, from which the water is impounded that will ultimately generate several urban uses.

Generally, urban growth takes place towards the main sources of water resources. Usually, springs and dams are physically involved in the urban border of large cities.

Besides this physical expansion and the demographic growth, the production of domestic and industrial waste, solid and semi-solid debris and liquid effluents also constitutes a phenomenon of urbanization, more intensively in large cities.

The implementation of exhaustion systems with the collection, removal and treatment of effluents and sewer constitutes another necessity and essential condition for the urban development.

Briefly, the urban break-even point is attained through the cycle whose steps are: (a) water impound for supplying; (b) generation of debris and effluents (sewer); (c) impound and removal of effluents; (d) treatment of effluents; (e) post-treatment launching of effluent into water bodies; and (f) self-purification in water bodies.

Usually, the intense urbanization of the hydrographic basins causes a break in the established balance that is evidenced through the higher production of debris and effluents than the capacity of self-purifying water bodies. Therefore, the environmental deterioration of the water impounds and the gradual loss of the water quality appear as a common denominator in densely urbanized areas.

Thus this deterioration and pollution of water streams is aggravated with the demographic growth, thus consequently increasing the pollution that is continuously launched into watercourses.

More specifically, with regard to the sewer treatment systems object of the present invention in regions showing an organized urban concentration, the latter can be classified in four categories, viz: a) the cities that do not have any type of impound, removal and sewer treatment station, wherein all sewer and served water generated by the urban concentration is launched into the pluvial water network, that in turn heads for the bed of streams or secondary rivers that flow to water bodies, the main ones for the region, that in turn can cross several cities until the flow to the sea or a dam; b) there are cities that are provided with single sewer treatment systems that collect of individually or collectively (sectors) the sewer generated by the urban concentration and then launches same into the pluvial water network being treated in STS's except in the rain, and from this point onwards the treated sewer is conveyed in the same way previously described until it reaches the course of main or huge water bodies; c) there are cities, however, that are provided with a whole separating system for the load of sewer generated, and in this in case all the sewer generated by the urban concentration is collected and conveyed to a treatment station, wherein the debris are removed and purified and the residual water, after being treated, is launched into the water streams and/or dams; and d) there are cities, irrespective of their size, whose sewer treatment system is a combination wherein part of the population uses a single sewer collection system, others use a whole separating system and there also is a part of the population that does not use any sewer collection or treatment system, launching the latter into water bodies, either directly or through the existing pluvial water network.

Also considering that a water body crosses throughout its whole course innumerable poles of urban concentration that are embodied in the above-mentioned different standards, it is evident that the contamination and pollution level downstream a water body is significantly larger, thus inevitably impairing the urban concentration geographically situated in this portion of the water body, or in the event it is not nearby, it is supplied with the waters from said water body.

For the treatment of water bodies, the process for removing pollutant materials and/or substances contained in water streams, which is an object of patent document U.S. patent application Ser. No. 10/167,089, of Jun. 10, 2002 and Brazilian patent document No. PI0105462-7, of Jun. 11, 2001, which process guarantees the elimination of the aspects that offend the aesthetic sense, as well as the conservation of the natural water resources against severe pollution and its maintenance under full use conditions, either in the containment of water resources for future reutilization; either in the implementation and development of industries, or in the use of urban water streams as recreational and sports elements.

However, the process defined in patent document U.S. patent application Ser. No. 10/167,089, of Jun. 10, 2002 and Brazilian patent document No. PI0105462-7, of Jun. 11, 2001, whose steps are carried out along the water stream itself, provides a continuous dynamic flotation treatment of the whole volume of water that crosses same, so that the already treated water flowing downstream this process area is still vulnerable to new foci of pollution if any type of additional procedure for containing the spill of sewer discharges in this water body is not adopted.

Ideally, all the urban concentrations should in effect have at least one a sewer treatment station—STS—which can carry out at least a primary treatment of the sewer collected in order to reduce the contamination level of the water bodies that serve these urban concentrations.

Another ideal condition for any standard of urban concentration is that all the load of sewer generated for the community is collected and sent to a treatment station—STS—reducing the levels of sewer launched into water bodies to almost zero. Sometimes said level does not reach 100% because there always will be clandestine launching of sewer water bodies, either directly or indirectly, through the pluvial water networks, either through main streams or secondary streams.

Another ideal condition, mainly for expanding cities, is the provision of a sewer treatment station—STS—that is dynamic, that is, that can be expanded as the urban concentration increases, thus preventing the possibility of collapse of an existing station and not requiring, to prevent a possible collapse of the treatment facility, a large initial investment in the construction of a huge station that will remain idle in the beginning, while a predicted demographic expansion does not occur.

Therefore one of the objects of the present invention is to provide the coupling of a sewer treatment station—STS—to a treatment plant for the flocculation and flotation of water streams that makes it possible to direct all the sewer generated in the urban concentration thus thoroughly saving the stream bed of the main water stream, that in turn is already provided with the dynamic flotation treatment process, that will be a secondary or even tertiary sewer treatment step in said coupling.

Another object of the present invention is to provide a coupling of a sewer treatment station—STS—to a treatment plant for the flocculation and flotation of water streams that guarantees an anticipated definition of the quality of treated water without generating any loss in terms of investments in sewer networks, removals and STS's of any urban concentration.

Still another object of the present invention is to provide a coupling of a sewer treatment station—STS—to a treatment plant for the flocculation and flotation of water streams that can be dynamically installed, that is, the expansion of which is determined according to the expansion of the urban concentration that generates the sewer collected, thus preventing the huge size of the installations generally carried through in order to prevent a collapse of the system.

Another object of the present invention is to provide a coupling of a sewer treatment station—STS—to a treatment plant for the flocculation and flotation of water streams that can be installed both next to the stream bed of the water body that already is under the treatment process for the flocculation and flotation and far from said water body, provided that the outlet drain of said sewer treatment station—STS—is directly connected to the inlet of the station that promotes the treatment for the flocculation and flotation of the water body.

Considering that in an urban system besides the sewer treatment stations—STS's—the existence of water treatment stations—WTS's—is essential; and considering that the conventional or classical water treatment stations—WTS's—carry out the treatment in separate compartments usually comprised of: fast mixers, flocculators, decanters, filters and contact tank, wherein the suitable sanitation of the water is assured; it should be emphasized in general terms that said conventional or classic treatment stations that treat the water through flocculation, decantation and filtration can eliminate only the colloids and suspended material present therein, that drag the pathogenic organisms associated thereto. Other remaining organisms not provided with possible protective barriers, are submitted sequentially to a sanitation process, usually through chlorination, and are then eliminated.

Thus, not only the sewer to be launched into fluid beds presents risk to the population but also in view of the sanitation issue, the way the supplying water is treated is worrisome, considering that the water-borne illnesses still constitute the cause of a significant percentage of deaths. With the exception of the poisonings produced by waste substances generated by industrial activities, the waterborne illnesses are caused by such microorganisms as viruses, bacteria, protozoa and worms. Considering that the waters launched into the riverbeds will be impound and contained later on to serve as supply water to another urban center, it is also important that the, besides STS's, WTS's are also submitted to an effective sanitation treatment.

Thus, another object of the present invention is to provide the insertion of a treatment plant for the flocculation and flotation of water streams into a preexisting conventional type water treatment station—WTS—and/or that said insertion is implemented in a new unit designed according to the treatment plant described herein-above, thus allowing among others the optimization of the process for removing protozoa such as "Cryptosporidium sp"; "Cyclospora"; "Isospora belli"; and "Microsporiodeo sp", and the removal of practically all the seaweed that can hardly be removed by the conventional treatment processes.

Still another object of the present invention is to provide an insertion of a treatment plant for the flocculation and flotation of water streams into a water treatment station—WTS—having a longer useful life, thus reducing the maintenance costs in relation to the conventional Water Treatment Stations.

Another object of the present invention is to promote the insertion of a treatment plant for the flocculation and flotation of water streams into a water treatment station—WTS—that promotes the treatment through flocculation, decantation and filtration, replacing the flocculation and decantation phases, by the treatment process for the flocculation and flotation of fluid beds, used in patent document U.S. Ser. No. 10/167,089, of Jun. 10, 2002 and relevant Brazilian patent document No. PI0105462-7, of Jun. 11, 2001, through the use of the preexisting WTS tanks without the need to include a new constructive device.

Another object of the present invention is to provide the insertion of a treatment plant for the flocculation and flotation of water streams into a water treatment station—WTS—with a larger capacity for producing water for the consumption that can operate with varying flow rates.

SUMMARY OF THE INVENTION

According to the first aspect of the present invention, its objects are attained by coupling of sewer treatment station—STS—to a treatment plant for the flocculation and flotation of water streams of the type carried through by the treatment process defined in patent document U.S. patent application Ser. No. 10/167,089, filed Jun. 10, 2002 and Brazilian patent document No. PI0105462-7, of Jun. 11, 2001, said coupling comprising the installation of the sewer treatment station—STS—downstream the flocculation and flotation treatment station, so that the outlet of said STS is directly connected to the inlet of the flocculation and flotation treatment plant disposed on the stream bed of the water body or next to and interconnected thereto by means of an induced flow canal.

According to the second aspect of the present invention, its objects are attained by inserting a treatment plant for the flocculation and flotation of water streams into a water treatment station—WTS—that comprises the dynamic implementation, instead of the flocculation and decantation steps, the treatment process steps for the flocculation and flotation of fluid beds used in patent document U.S. patent application Ser. No. 10/167,089, of Jun. 10, 2002 and Brazilian patent document No. PI0105462-7, of Jun. 11, 2001, but said treatment is thoroughly carried throughout in a closed canal wherein the flow of secondary streams is continuously dynamically submitted to flocculation and flotation techniques in a varying flow rate canal.

BRIEF DESCRIPTION OF THE DRAWINGS

The present invention is described with reference to the accompanying drawings, given as an example without any limitation, wherein:

FIGS. 3, 3a and 3b represent, respectively, designs of the implementation of the coupling of a sewer treatment station—STS—to a treatment plant for the flocculation and flotation of water streams originally assembled inside the stream bed of the water body;

DETAILED DESCRIPTION OF THE INVENTION

Figure 1:
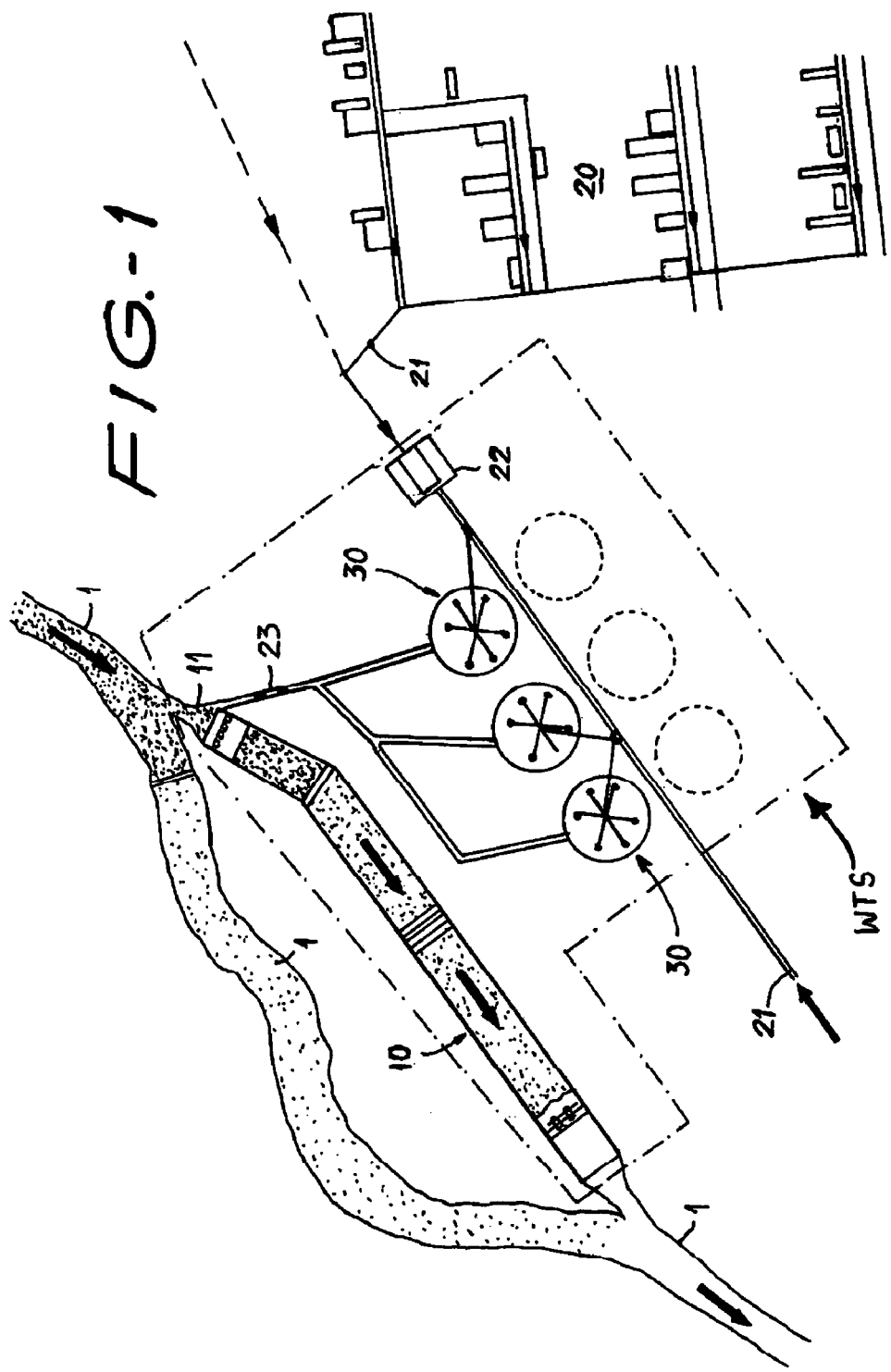
FIG. 1 represents a schematic top view of the length of a water body already submitted to the flocculation and flotation treatment, that is connected to a sewer collection and treatment station—STS fully proceeding from an established urban concentration.
Figure 2:
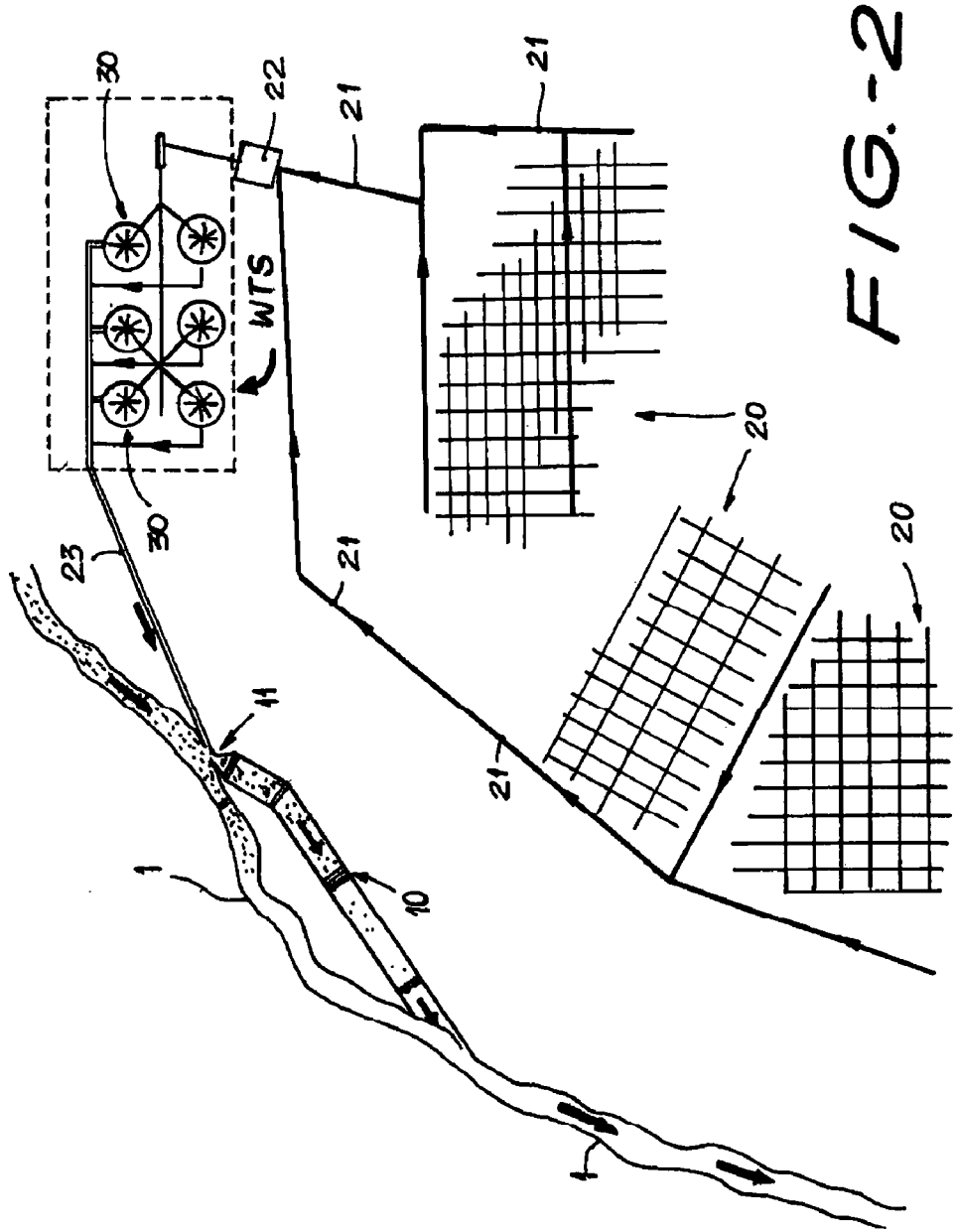
FIG. 2 also represents a schematic plan view of a longer length of the water body shown in the previous figure, in this case the sewer collection and treatment station—STS—being located farther from this water body already submitted to the flocculation and flotation treatment, said sewer treatment station—STS—receiving all the sewer generated in more than one urban concentration established next to the water body, and also shown schematically a water treatment station—WTS—between the water impound dam and the urban region to be supplied.

According to these illustrations, the first aspect of the present invention deals with the coupling of a sewer treatment station—STS—to a treatment plant for the flocculation and flotation of water streams, which is effected in a length of water body 1, where the treatment process for flocculation and flotation of water streams defined in patent document U.S. patent application Ser. No. 10/167,089, filed Jun. 10, 2002 and Brazilian patent document No. PI0105462-7, of Jun. 11, 2001, is already implemented herein-below called flotation station 10; said sewer treatment station—STS—being installed anywhere and at any distance from the water body 1, collecting all the sewer Qe generated by the established urban centers 20, said sewer generated being conveyed by the network 21 as far as the inlet of the sewer treatment station STS.

The outlet or drain for launching the liquid portion of treated sewer $Qe_2$ of said sewer treatment station STS is directly connected, through the network 23, to the inlet of the impound section 11 provided in an induced canal FE or in the stream bed of the water body 10 itself, where the flotation station 10 is located, which then represents an additional sewer treatment step. Thus, the sewer $Qe_2$ already treated together with the portion to water of the water body 1 impound in the inlet point 11 of the flotation station 10 will be submitted to the flotation process 10, defined by the flocculation, flotation and removal steps of the flotated mud and pumping thereof for purification or return to the primary treatment, RAFA. The resultant liquid volume of said flotation treatment 10 is launched again downstream into the water body 1, following the course of the latter for composing its normal outflow $Q_T$, see the figures.

It should be emphasized that the volume of sewer Qe from the network, before entering in the treatment station STS is submitted to a preliminary treatment step 22, comprising a grid system for retaining solid residues and followed by a sandbox, to be then effectively launched into the sewer treatment station STS.

In FIGS. 1, 2, 3a, 3b, 4a and 4b the sewer treatment station STS is an assembly of anaerobic reactors—RAFA 30, which, after the preliminary treatment 22, process the sewer Qe, thus configuring the primary treatment of the sewer Qe, while the flotation process 10 results in the secondary treatment of the sewer Qe, before it is launched into the water body 1, thus composing the downstream outflow $Q_T$ of the latter.

However, other embodiments of the sewer treatment station—STS—can be used after the preliminary treatment 22 and before the flotation process 10, in a way that the latter can even be classified as the tertiary treatment.

Therefore, besides the anaerobic reactors—RAFA 30, the sewer treatment station—STS—can be comprised of anaerobic ponds having or not any other pond, wherein the flotation process 10 is still a secondary treatment. In the case of the sewer treatment station—STS—being provided with anaerobic reactors—RAFA 30—and a biological filter, the flotation process 10 that comes next would already be classified as a tertiary treatment.

Thus, the use of the flotation process 10 subsequent to the sewer treatment station—STS—allows for a highly significant efficiency in the removal of relevant pollutants that are conventionally launched into water bodies 1.

FIGS. 3, 3a, 3b, 4, 4a and 4b clearly show that said coupling is to serve selectively and gradually all the types of cities, the implementation of which should take three steps, wherein: for cities without a partial sewer Qe collecting network or for cities with a sewer collecting network and without interceptors and STS, the flotation process 10 is initially assembled on the stream of river 1, see FIG. 3; in a second step, FIG. 3a, a partial sewer network and interceptors are constructed, wherein the preliminary treatment 22 is followed by STS's as the primary treatment, its coupling to the flotation process 10 defining the secondary treatment; and in a third step, when the primary treatment—STS—has already being expanded, whose expanded station Qe 2 starts to treat all the sewer Qe=$Qe_1$+$Qe_2$, so that a dam B in the course of the water body 1 is created, and a bypass in the latter, thus diverting from the flotation process 10, since it is fully unpolluted upstream, and thus said flotation process 10 is exclusively the secondary treatment of the sewer Qe network of this urban concentration, see FIG. 3b.

Figure 4:
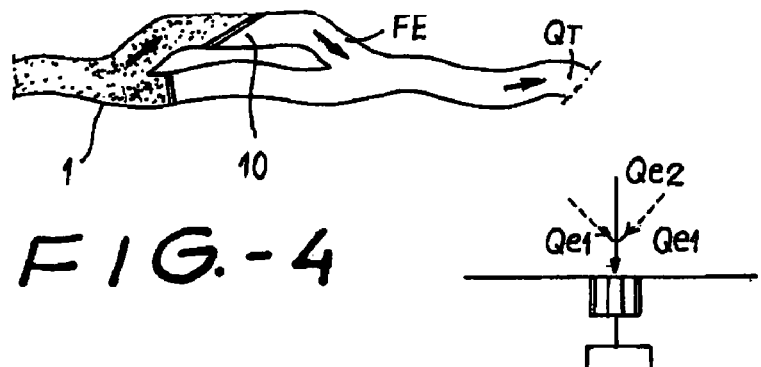
FIGS. 4, 4a and 4b represent, respectively, designs of the implementation of the coupling of a sewer treatment station—STS to the treatment plant for the flocculation and flotation of water streams originally assembled in an induced flow canal.
Figure 4A:
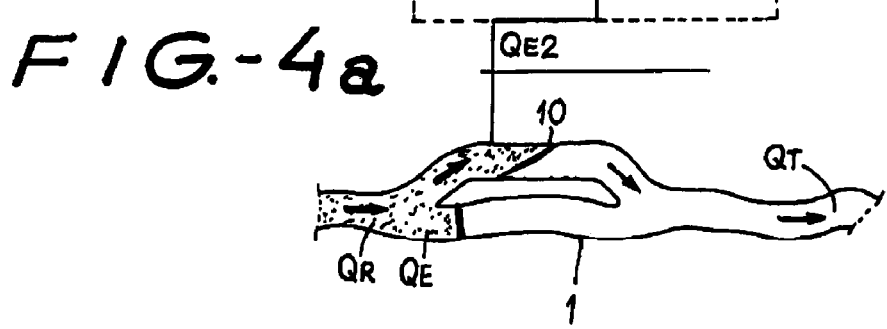
Figure 4B:
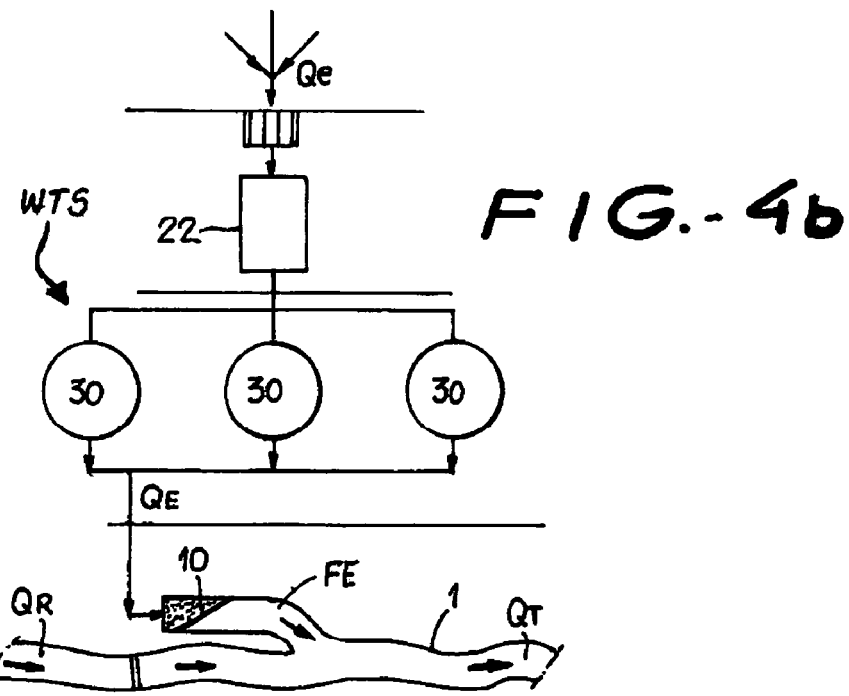
Figure 5:
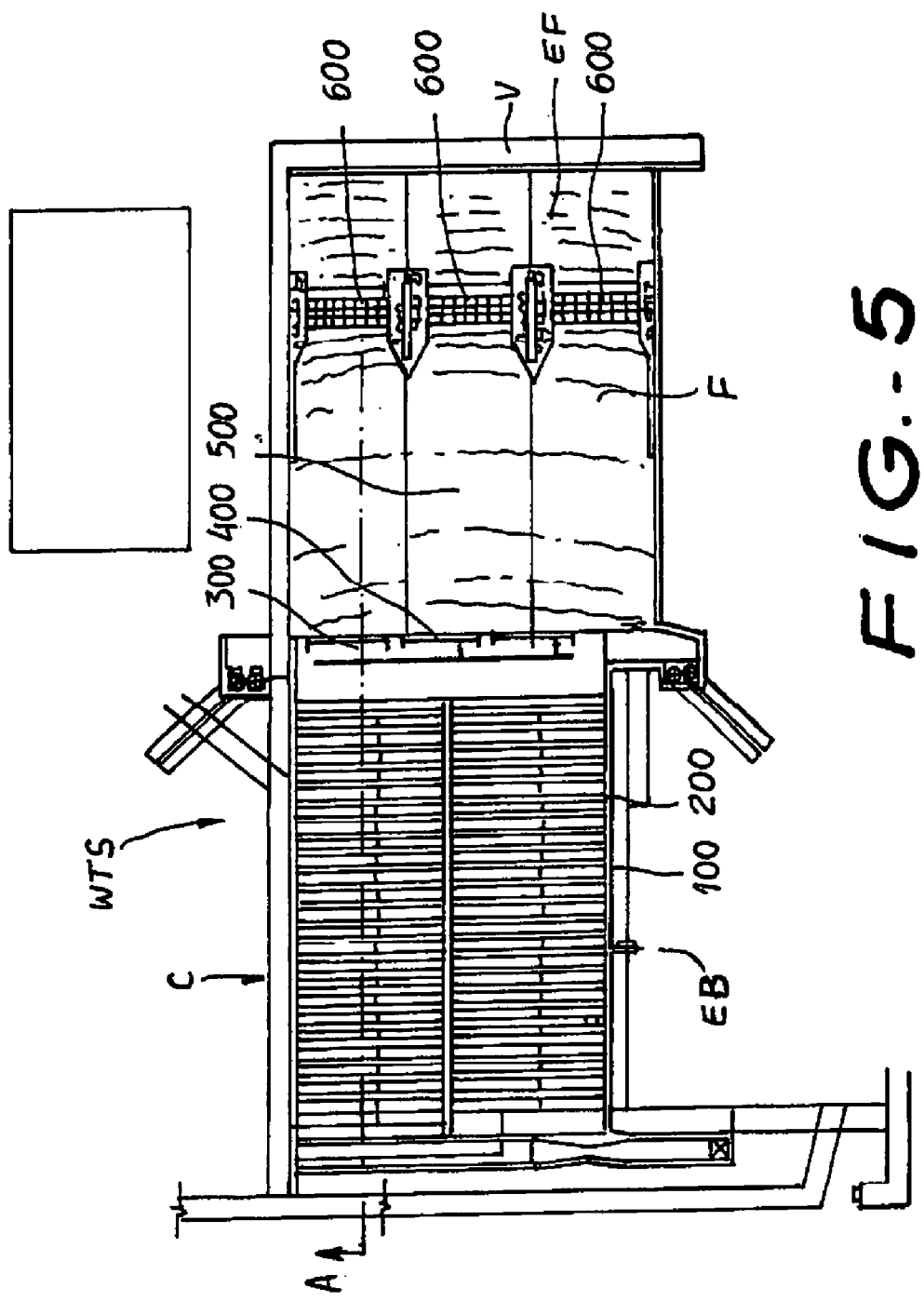
FIG. 5 represents a schematic plan view of the water treatment station—WTS—modified according to the insertion proposed in the present invention.
Figure 6:
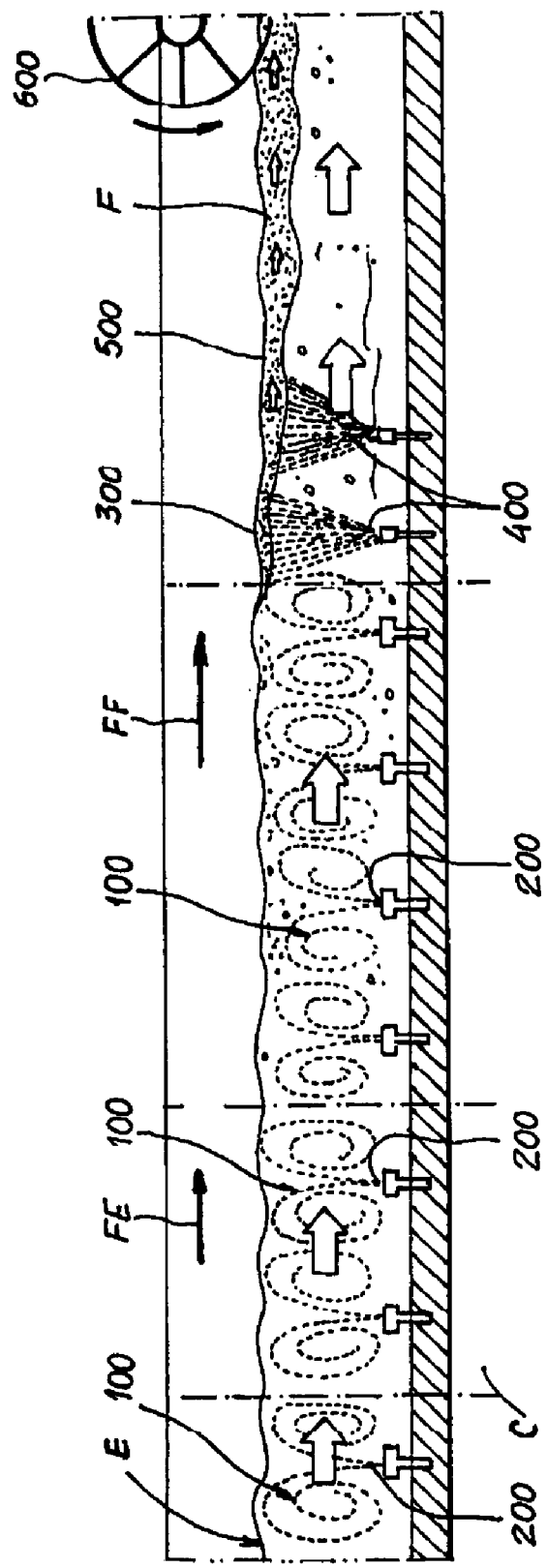
FIG. 6 represents a longitudinal cut of a portion of the water treatment station—WTS—taken along arrow "A-A" of the previous figure.

The same happens when the flotation process 10 is implemented in an induced canal FE next to the water body 1, where the three steps are repeated since the implementation of the flotation process 10 itself, passing along the coupling of the STS, thus said second step configures a collection and partial treatment of the sewer $Qe_2$, and finally the treatment station STS is expended and the induced canal FE is interrupted, thus starting to treat by flotation all and only the Qe sewer collected and treated by the treatment station STS coupled thereto, see FIGS. 4, 4a and 4b.

Thus, said coupling can be implemented in cities that are not provided with any type of collection, removal and sewer treatment station and have all the sewer $Qe_1$ and served water generated by the urban concentration launched into the pluvial water network, that in turn go to the bed of streams or secondary rivers that discharges into water bodies 1, see FIGS. 3, 3a. Also, it can be coupled in cities that are provided with single sewer treatment systems that collect individually or collectively (sectors) the sewer $Qe_1$ generated by the urban concentration that launch same into the pluvial water network afterward, being treated in STS's except in the rain, and from point on the treated sewer is conveyed in the same way described herein-above until it reaches the course of main or huge water bodies 1. Also, said coupling is suitable to cities that are provided with a whole separating system 22 of the load of sewer Qe generated, and in this in case all the sewer $Qe=Qe_1+Qe_2$ that is generated by the urban concentration is collected and conveyed to a treatment station, wherein the residues are removed and purified and the residual water, after being treated, is launched into the water streams and/or dams 1, see FIGS. 3b, 4b; and mainly said coupling is adjusted for cities that are initially provided with a mixed system for treating sewer Qe, wherein part of the population uses a single system for collecting sewer $Qe_2$ and others use a whole separating system and part of the population does not use any system for collecting or treating sewer $Qe_1$, launching the latter in water bodies 1, directly or through the existing pluvial water network. In this case, with the implementation of the coupling, as the collection and conveyance of sewer $Qe_1$ is centralized in the treatment station STS, it is not launched into water bodies 1 directly, so that the latter is unpolluted along all its urban length, see FIGS. 3b and 4b.

According to the second aspect of the present invention, illustrated in FIGS. 2, 5, 6 and 7, the insertion of a treatment plant for the flocculation and flotation of water streams in a water treatment station—WTS—comprises the dynamic sequential introduction of the treatment process for the flocculation and flotation of fluid beds into a conventional water treatment station, said treatment being fully carried through in a closed canal C, where the flow of secondary streams is dynamically continuously submitted to flocculation and flotation techniques in an induced flow canal.

Figure 7:
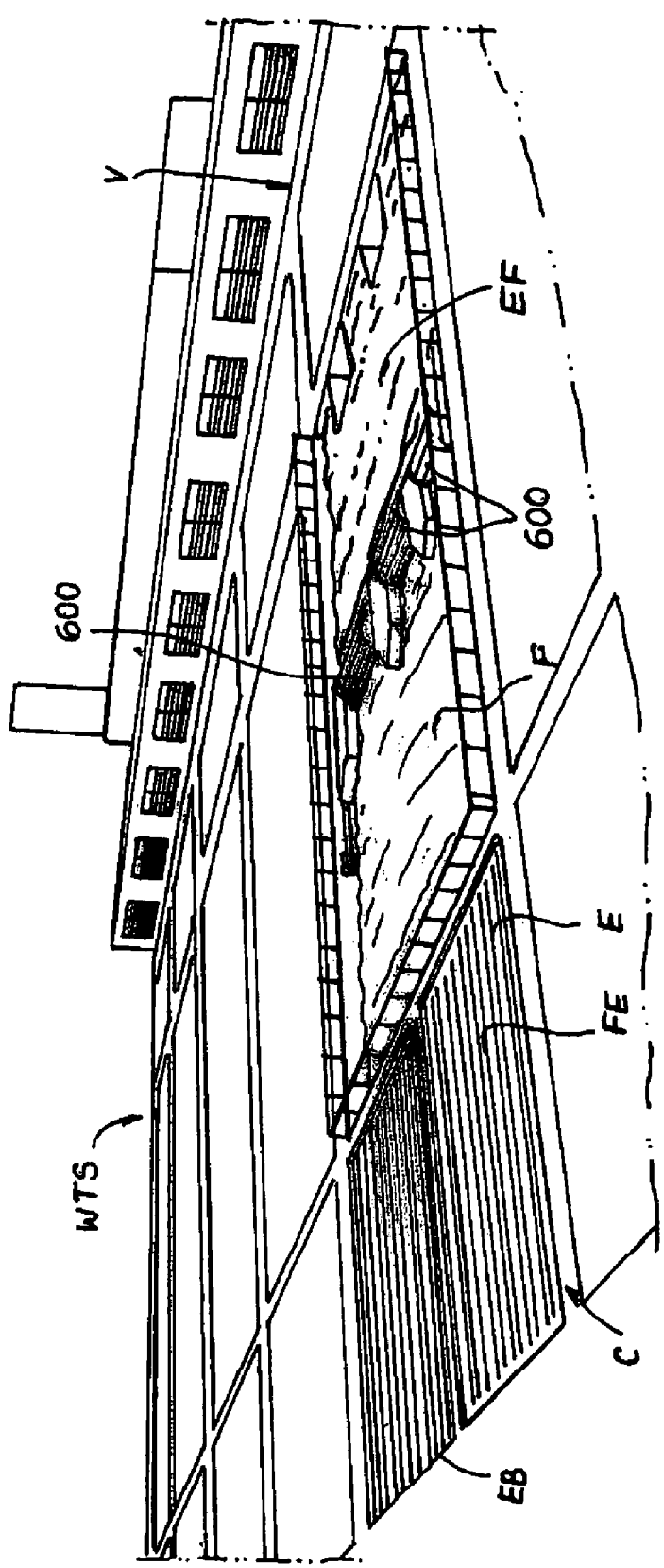
FIG. 7 represents a schematic perspective view of the water treatment station—WTS—according to the insertion of the flotation treatment plant in a changeable flow.

In the figures, the liquid secondary stream E from the natural or canalized stream bed Re containing suspended solids is caught by a crude water elevation station EB; it passes along a grid system for retaining solid residues; and is launched into a closed canal. As illustrated in FIG. 7, this secondary stream E is conveyed by an induced aeolian force FE generated by a ventilation unit, not shown, that is assembled on the entrance of said closed canal C, in order to convey this secondary stream E to the typical steps of the flotation process defined by: application of flocculant or coagulating material 100 by introducing air and/or oxygen 200 in an initial length of the treatment canal C, generating a flocculation with the removal of particulates due to the oxidation; next, a flocculation basin 300 is provided, the aggregation of the suspended particles being downstream, defining flakes of a larger dimension; these larger coagulated particles in the flocculation basin 300 are driven forward due to the aeolian force FE and submitted to successive steps of dissolution and injection of the comminuted water/air mixture 400 from a mixing device, not shown; wherein said water/air mixture, when launched into the bottom of the canal, causes the flotation of the above-mentioned aggregated particles, thus making it possible to define a flotation basin 500 from this length on, where the agglomeration and thickening of the flotated material F on the surface takes place downstream and next to a capture trough with a lesser depth that the one defined by the closed canal C and assembled transversally to the latter, in order to serve as a permanent and continuous spillway for the resulting flotated material or mud F that, after being collected, for example, by the rotary dragging means 600; wherein the already treated residual liquid portion of said flotated secondary stream EF is conveyed to an outlet chamber where it is partially reused by the mixing device, the remainder being launched out of the closed canal, through a second spillway V, exhibiting minimum characteristics required to be launched into the WTS filters in the reservoirs, to supply the public in the city later on.

The sequential application of the flotation process instead of the flocculation and decantation steps in the conventional treatment model in the classical WTS provides a highly significant efficiency in the removal of seaweed and saturated organic load, as well as in microorganisms such as the protozoa, thus preventing the need of using chlorine for sanitation and preventing the pre-chlorination for the seaweed removal during the residence time in the water and consequently the final production of water for supplying the WTS is incremented.

Although a preferred constructive conception of a coupling of the sewer treatment station—STS—to the treatment plant for the flocculation and flotation of water streams and a preferred conception of the insertion of said treatment plant by the flocculation and flotation of water streams in a water treatment station WTS have been described and illustrated, it should be emphasized that other options including the construction of new units are predictable and realizable without departing from the scope of the present invention.

What is claimed is:

1. An apparatus for treating sewer water which includes coupling of a sewer treatment station to a treatment plant for the flocculation and flotation of water streams the apparatus comprises installation of the sewer treatment station upstream of the flocculation and flotation treatment plant, in such a way that the outlet of said sewer treatment station is directly connected to an inlet of the flocculation and flotation treatment plant, the flocculation and flotation treatment plant being disposed on a stream bed of a water body or next to the stream bed of the water body, and interconnected with said stream bed of the water body by means of an induced flow canal, wherein the sewer treatment station is comprised of anaerobic reactors and biological filter, and where the flocculation and flotation plant is classified as a secondary or tertiary treatment.

2. The apparatus for treating sewer water according to claim 1, wherein the sewer treatment station is installed at any distance from the water body, collecting all the sewer (Qe) generated by established urban centers, by means of a network that conveys the domestic sewer (Qe) to the inlet of the sewer treatment station.

3. The apparatus for treating sewer water according to claim 1, wherein the sewer treatment station is comprised of an assembly of anaerobic reactors that, after the preliminary treatment, process sewage, thus configuring the primary treatment of said sewer, while the flotation process results in the secondary treatment of said sewer, before it is launched into the water body, thus composing the regular flow rate ($Q_T$) of the latter.

4. The apparatus for treating sewer water according to claim 1, wherein the sewer treatment station is comprised of an anaerobic pond, and/or any other pond, where the flotation process is as a secondary treatment.

* * * * *